Feb. 11, 1958   R. M. JOHNSON   2,822,571
APPARATUS FOR MAKING HOLLOW FRANKFURTERS
Filed July 20, 1953
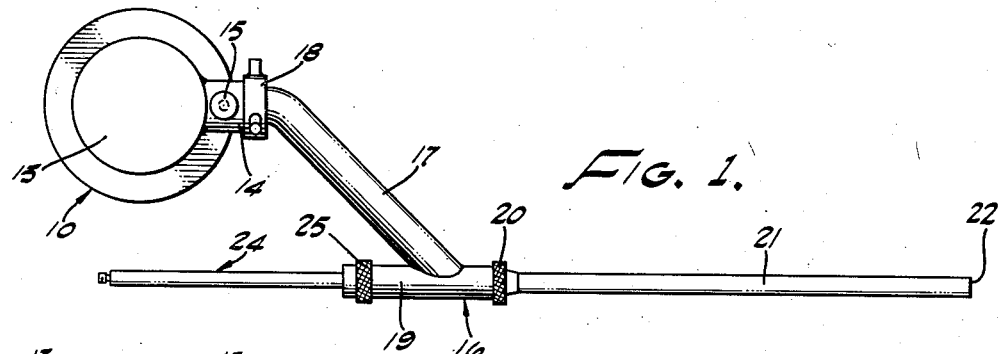
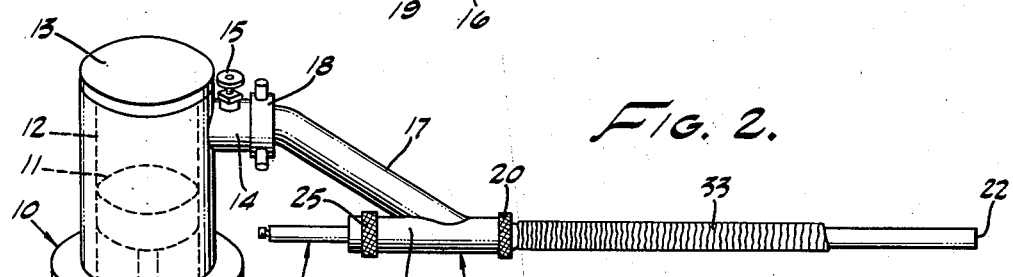
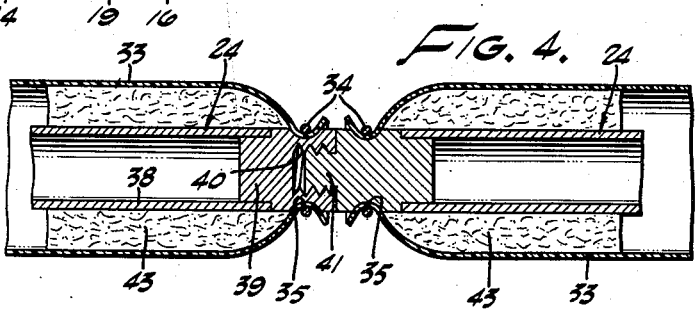
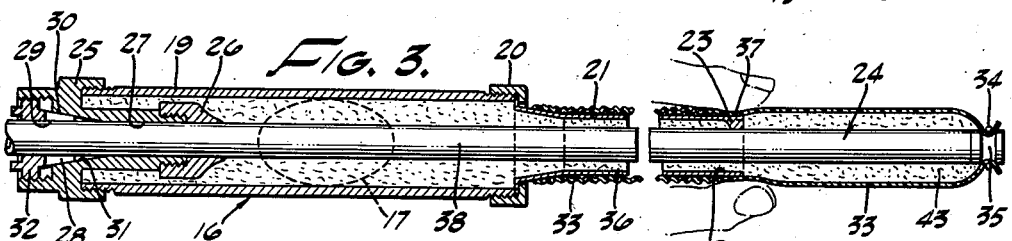
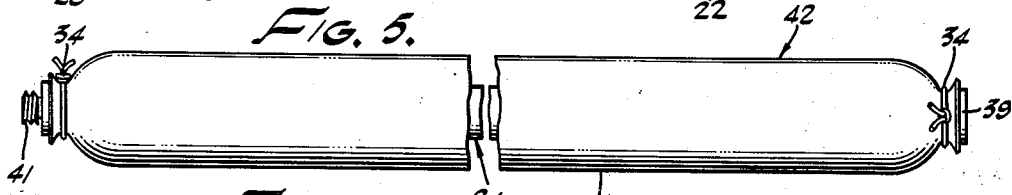
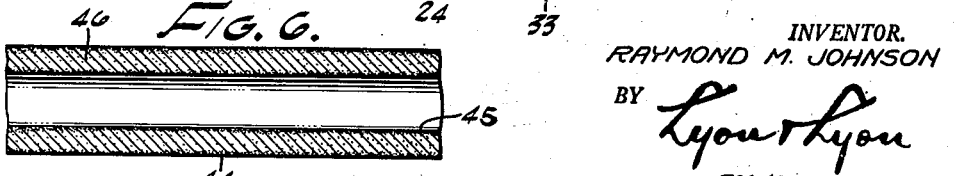
INVENTOR.
RAYMOND M. JOHNSON
BY Lyon & Lyon
ATTORNEYS

United States Patent Office 2,822,571
Patented Feb. 11, 1958

2,822,571

APPARATUS FOR MAKING HOLLOW FRANKFURTERS

Raymond M. Johnson, Los Angeles, Calif., assignor of one-half to Llewelyn B. Stearns, Rivera, Calif.

Application July 20, 1953, Serial No. 369,068

3 Claims. (Cl. 17—39)

This invention relates to frankfurters and is particularly directed to a hollow frankfurter having an axial opening extending therethrough, as well as to an improved method and apparatus for making such an article.

Conventional type "skinless" frankfurters are commonly made by extruding ground meat through an open-ended pipe or stuffer horn. A thin wall casing formed of plastic material is placed on the outer surface of the pipe and is closed at its forward end, as by means of a string. As the ground meat is extruded under pressure from the stuffer horn it is received within the thin wall casing or "skin." The casing is tied with the string at intervals to form the individual frankfurters. After a series of frankfurter lengths has been extruded and tied off they are subjected to smoke treatment for color improvement and later to steam heat for cooking. The plastic casing or "skin" is removed after the cooking.

It is an object of my invention to adapt this process to the production of hollow frankfurters which have an axial opening extending from end to end. This opening is preferably cylindrical although it may be of any other desired shape. The opening provides a cavity for stuffing pickles, cheese, mustard, relish or other comestibles into the interior of the frankfurter. The stuffed frankfurter may then be sliced into disks to produce hors d'ouevres or the stuffed frankfurter may be placed within a bun to form a "hot dog."

Another object of my invention is to provide a novel method of extruding ground meat over a central support member which may later be removed after the cooking step to form the central opening.

Another object is to provide improved apparatus wherein the pressure of the ground meat in the extruding head is effective to cause axial movement of the central meat support member through the extruding head.

A related object is to provide a hollow frankfurter which has been cooked from both inside and outside.

Other and more detailed objects and advantages will appear hereinafter.

In the drawings:

Figure 1 is a top plan view showing a preferred embodiment of my invention.

Figure 2 is a perspective view.

Figure 3 is a longitudinal sectional view.

Figure 4 is a sectional detail showing the detachable coupling connecting adjacent ends of the carrier rods.

Figure 5 is a side elevation partly broken away showing an extruded unit mounted on one of the carrier rods.

Figure 6 is a transverse sectional view showing a hollow frankfurter embodying my invention.

Referring to the drawings:

A hydraulic press generally designated 10 includes a movable piston 11 operating within a pressure cylinder 12. A removable closure 13 provides means for introducing ground meat into the cylinder 12. Power means, not shown, are provided for moving the piston 11 within the cylinder 12. A lateral outlet 14 communicates with the cylinder 12 and is provided with a valve 15 for controlling flow of ground meat through the outlet 14.

In accordance with my invention, I provide an extrusion head generally designated 16 which includes an inlet conduit 17 connected to the outlet 14 by means of the threaded collar 18. The inlet conduit 17 communicates with the central cylindrical body 19 at a location between its ends. As shown in Figure 3, a nut 20 serves to clamp one end of the stationary pipe or stuffer horn 21 to the forward end of the body 19. This stuffer horn has a discharge opening 22 at its forward end. A series of guide lugs 23 are provided within the stuffer horn 21 adjacent the discharge opening 22.

A carrier rod 24 extends axially through the body 19 and through the stuffer horn 21 and is guided on its outer surface by means of the lugs 23. A closure 25 is threaded to the rear end of the body 19 and carries a seal ring 26 which engages the outer surface of the rod 24 in fluid type relationship. This seal ring 26 prevents ground meat under pressure from being forced through the annular space between the rod 24 and the bore 27 of the closure 25.

If desired a split tapered wedge ring 28 may be provided with a cylindrical bore 29 for contact with the outer surface of the rod 24. The outer surface 30 of the wedge ring is tapered to fit within the conical bore 31 on the member 25. A nut 32 may be turned to force the split tapered ring 28 into the conical bore 31 and thereby establish a frictional drag on the surface of the rod 24.

The "skin" or thin wall casing 33 in shirred form is mounted on the outer surface of the stuffer horn 21 so that its overall length is considerably shortened. The forward end of the casing 33 is then secured to the forward end of the rod 24. This may be accomplished by means of a cord or string 34 which encircles the casing 33 at the location of a groove 35 in the rod 24. If desired, a suitable clip may be used instead of a tie cord 34. The control valve 15 on the outlet 14 of the extrusion press is then opened to force ground meat under pressure through the inlet 17 and body 19 into the annular space 36 between the rod 24 and stuffer horn 21. This ground meat is extruded through the discharge opening 22 into the annular space between the casing 33 and the rod 24. The pressure of the ground meat causes the rod 24 and the forward end of the casing 33 to move axially relative to the stuffer horn 21. A restriction around the outside of the stuffer horn 21 adjacent its outer edge is preferably imposed by manually restricting the outer surface of the casing 33 at the point 37, as shown in Figure 3. This prevents passage of ground meat onto the exterior surface of the stuffer horn 21.

For convenience I prefer to employ carrier rods 24 which are about five feet long. The carrier rods are preferably formed of metal and are preferably hollow for light weight. As best shown in Figure 4, each rod 24 includes a length of metal tubing 38 having a plug fitting 39 fixed to each end. The fitting 39 on one end is provided with a threaded socket 40 and the fitting on the other end is provided with a threaded pin 41. The helix angle of the engaging threads is preferably steep so that only one-half of a revolution is required to fully engage them.

When the first rod 24 has passed completely through the stuffer horn 21, the casing 33 is tight at its rearward end in the groove 35 provided at the rearward end of the rod. The adjoining following rod 24 is connected end to end by means of the threaded parts 40 and 41 just described. The rod 24 with its extruded ground meat and casing is then disconnected from the following rod. The casing 33 in corrugated or bellows form is long enough to supply several rods 24, but when an additional length is required it is installed in the outer surface of the stuffer horn 21 by passing it over the open end of the stuffer horn. The forward end of the new casing 33 is then attached to the projecting end of the rod 24 which now is positioned within the stuffer horn 21 and the extruding operation is repeated.

It is desirable to connect the rods end to end so that there is always a rod 24 within the seal member 26, thereby preventing escape of ground meat through the bore 27 in the member 25.

If the rod 24 and casing 33 should move too rapidly under the applied pressure of ground meat, the nut 32 may be turned to tighten the split wedge ring 28 about the outer surface of the rod 24 and thereby slow down its rate of movement.

When a unit 42 comprising a carrier rod 24, extruded ground meat 42, and casing 33 is disconnected from the following carrier rod 24, it is first taken to the smoke room and later to the steam room for cooking. The carrier rod, therefore, serves as a means of handling the extruded ground meat during smoking and during cooking. The unit 42 may conveniently be suspended from one of the cords 34 as it is transferred from the extrusion press 10 through the smoke room and through the steam room.

The cooking time is materially shortened because the radial thickness of the ground meat is not as great as is the case with a solid conventional frankfurter. Moreover, the metal rod 24 conducts heat from its ends so that the ground meat is cooked from the inside as well as from the outside.

After cooking, the casing or "skin" 33 is removed and the ground meat is stripped axially from the rod 24. The five foot tubular length of ground meat is then cut into shorter convenient lengths of frankfurters 44. The frankfurters are characterized by the central opening 45 which extends from end to end. This opening is cylindrical if the rods 24 are cylindrical but it will be understood that the use of non-circular rods 24 will produce non-circular openings 45. A further characteristic of the improved frankfurter 44 is that the meat adjacent the central opening 45 and the meat adjacent the outer surface is more thoroughly cooked than the meat at the central portion 46 of the wall thickness of the frankfurter. This characteristic results from the cooking process wherein heat is applied both internally and externally of the hollow frankfurter, as described above.

Having fully described my invention, it is to be understood that I do not wish to be limited to the details herein set forth, but my invention is of the full scope of the appended claims.

I claim:

1. A device for making hollow frankfurters and the like comprising in combination: an extrusion head having an opening therethrough and an inlet conduit extending laterally thereinto, a stuffer horn connected to said head in alignment with said opening and adapted to have a casing carried thereby, a carrier rod extending through said opening and said stuffer horn, a rod bearing and sealing means between said head and said rod and a casing securing means on the end of said rod outwardly of said stuffer horn, whereby when an end of the casing is secured to said rod and ground meat is introduced into said opening through said inlet, the same will fill the casing and force the rod outwardly of said head.

2. The combination set forth in claim 1 in which brake means are provided on the head to retard the rate of movement of the rod.

3. The combination set forth in claim 1 in which guide means are provided within the stuffer horn for sliding contact with said rod.

References Cited in the file of this patent

UNITED STATES PATENTS

| 1,107,184 | Priban | Aug. 11, 1914 |
| 2,186,435 | Serr | Jan. 9, 1940 |
| 2,240,522 | Serr | May 6, 1941 |
| 2,568,491 | Edwards | Sept. 18, 1951 |
| 2,580,726 | Brewer | Jan. 1, 1952 |
| 2,635,561 | Elsaesser | Apr. 21, 1953 |